United States Patent
Addepalli et al.

(10) Patent No.: US 9,507,630 B2
(45) Date of Patent: Nov. 29, 2016

(54) APPLICATION CONTEXT TRANSFER FOR DISTRIBUTED COMPUTING RESOURCES

(75) Inventors: Sateesh K. Addepalli, San Jose, CA (US); Raghuram S. Sudhaakar, Mountain View, CA (US); Jean-Philippe Vasseur, Saint Martin d'Uriage (FR); Flavio Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 13/370,067

(22) Filed: Feb. 9, 2012

(65) Prior Publication Data

US 2013/0212212 A1    Aug. 15, 2013

(51) Int. Cl.
*G06F 15/16* (2006.01)
*G06F 9/48* (2006.01)
*G06F 9/46* (2006.01)

(52) U.S. Cl.
CPC ............ *G06F 9/4856* (2013.01); *G06F 9/461* (2013.01); *G06F 9/4862* (2013.01)

(58) Field of Classification Search
CPC ..... G06F 9/461; G06F 9/4862; G06F 9/4856
USPC .................................. 709/217, 203
See application file for complete search history.

(56) References Cited

U.S. PATENT DOCUMENTS 6,134,598 A * 10/2000 Raman ............... G06F 17/30569
                                                    707/E17.006
6,449,695 B1 * 9/2002 Bereznyi ............... G06F 12/123
                                                    707/E17.12
6,594,685 B1 * 7/2003 Mishra .................... H04L 29/06
                                                    370/352

(Continued)

FOREIGN PATENT DOCUMENTS

WO    WO-0186440 A2    11/2001
WO    WO-0195094 A2    12/2001

(Continued)

OTHER PUBLICATIONS

U.S. Appl. No. 61/470,310, filed Mar. 31, 2011.*

(Continued)

*Primary Examiner* — Anthony Mejia
(74) *Attorney, Agent, or Firm* — Parker Ibrahim & Berg LLC; James M. Behmke; Stephen D. LeBarron (57) ABSTRACT

In one embodiment, a universal programming module on a first device collects context and state information from a local application executing on the first device, and provides the context and state information to a context mobility agent on the first device. The context mobility agent establishes a peer-to-peer connection with a second device, and transfers the context and state information to the second device, such that a remote application may be configured to execute according to the transferred context and state information from the first device. In another embodiment, the context mobility agent receives remote context and remote state information from the second device, wherein the remote application had been executing according to the remote context and remote state information, and provides the remote context and remote state information to the universal programming module to configure the local application to execute according to the remote context and remote state information.

17 Claims, 8 Drawing Sheets

(56) References Cited

U.S. PATENT DOCUMENTS

| | | | |
|---|---|---|---|
| 7,409,452 B2* | 8/2008 | Ragnet | G06F 17/30011 358/1.15 |
| 7,522,595 B2 | 4/2009 | Ben-Dvora et al. | |
| 7,602,765 B2* | 10/2009 | Cho | H04L 12/581 370/331 |
| 7,657,268 B2 | 2/2010 | Oswal et al. | |
| 7,680,060 B2* | 3/2010 | Jennings | H04L 43/0817 370/252 |
| 7,716,721 B2 | 5/2010 | Zavalkovsky et al. | |
| 7,920,519 B2 | 4/2011 | Oswal et al. | |
| 7,950,010 B2* | 5/2011 | Goger | G06F 8/61 709/220 |
| 8,074,094 B2 | 12/2011 | Haag et al. | |
| 8,171,137 B1* | 5/2012 | Parks | G06F 9/4856 705/6 |
| 8,244,874 B1* | 8/2012 | Thireault | G06F 9/5055 709/226 |
| 8,473,577 B2* | 6/2013 | Chan | G06F 9/4856 709/217 |
| 8,526,885 B2* | 9/2013 | Lin | H04M 1/7253 340/12.51 |
| 8,966,172 B2* | 2/2015 | Malwankar | G06F 3/0611 710/1 |
| 2002/0013808 A1* | 1/2002 | Case | H04L 67/42 709/203 |
| 2003/0009536 A1* | 1/2003 | Henderson | G06Q 10/10 709/219 |
| 2003/0041095 A1* | 2/2003 | Konda | G06F 17/30569 709/201 |
| 2005/0273772 A1* | 12/2005 | Matsakis | G06F 8/41 717/136 |
| 2006/0179079 A1* | 8/2006 | Kolehmainen | 707/104.1 |
| 2007/0064698 A1 | 3/2007 | Appanna | |
| 2009/0070533 A1* | 3/2009 | Elazary | G06F 12/12 711/133 |
| 2009/0132649 A1* | 5/2009 | Hubbard | G06Q 10/0631 709/203 |
| 2009/0319611 A1* | 12/2009 | Turakhia | H04L 12/1822 709/204 |
| 2010/0274910 A1* | 10/2010 | Ghanaie-Sichanie | H04L 9/3234 709/229 |
| 2011/0153834 A1* | 6/2011 | Bharrat | G06F 11/1482 709/227 |
| 2011/0183666 A1* | 7/2011 | Song | H04L 67/14 455/432.1 |
| 2011/0191308 A1* | 8/2011 | Lowry | G06F 7/00 707/705 |
| 2012/0072757 A1 | 3/2012 | Haag et al. | |
| 2012/0092986 A1* | 4/2012 | Chen | H04L 45/22 370/228 |
| 2012/0096076 A1* | 4/2012 | Chan | G06F 9/4856 709/203 |
| 2012/0250858 A1* | 10/2012 | Iqbal | H04L 9/0861 380/44 |
| 2012/0290663 A1* | 11/2012 | Hsieh | G06F 9/4856 709/206 |
| 2013/0041790 A1* | 2/2013 | Murugesan | G06F 9/4856 705/30 |
| 2013/0080525 A1* | 3/2013 | Aoki | H04L 67/26 709/204 |
| 2013/0080542 A1* | 3/2013 | Peng | H04L 67/2823 709/206 |
| 2013/0124675 A1* | 5/2013 | Mo | G06F 9/461 709/217 |
| 2013/0318370 A1* | 11/2013 | Gorbatov | G06F 9/4893 713/300 |
| 2014/0096128 A1* | 4/2014 | Pohlmann | G06F 8/61 717/176 |
| 2014/0196140 A1* | 7/2014 | Gong | H04L 67/104 726/10 |

FOREIGN PATENT DOCUMENTS

| | | | | |
|---|---|---|---|---|
| WO | WO-2005069139 A1 | 7/2005 | | |
| WO | WO 2005069139 A1 * | 7/2005 | | G06F 9/46 |
| WO | WO 2012135614 A1 * | 10/2012 | | G06F 9/4856 |

OTHER PUBLICATIONS

Greenfield, Dave, "Cisco to Combine Google's Android, UC and Enterprise 2.0", ZDNet; accessed Feb. 2012, http://www.zdnet.com/blog/greenfield/cisco-to-combine-googles-android-uc-and-enterprise-20/182, pp. 1-2.

Sogno-Pabis, et al., "Notification of Transmittal of the International Search Report and the Written Opinion of the International Searching Authority, or the Declaration", Patent Cooperation Treaty, Apr. 22, 2013, PCT/US2013/025023, European Patent Office, Rijswijk, Netherlands.

* cited by examiner

APPLICATION CONTEXT TRANSFER FOR DISTRIBUTED COMPUTING RESOURCES

TECHNICAL FIELD

The present disclosure relates generally to computer networks, and, more particularly, to application contexts and distributed computing resources.

BACKGROUND

The reach of distributed computing and storage resources has steadily grown, and it is believed that this trend will continue into the future. For instance, Smart Connected Communities will have highly distributed resources including both mobile and non-mobile devices, such as at the level of rooms, floors, buildings, outdoors, etc. These resources can perform a variety of functions related to processing, storing data generated by various sensors and actuator devices as well as interacting and collaborating in a peer-to-peer/peer-to-group manner. Moreover, future mobile as well as non-mobile applications will generate highly dynamic loads with respect to compute power, geographic location and data volume. Edge-computing resources can be used to considerably improve latency, location relevance, real-time and cost performance.

To take advantage of this changing paradigm, current data-centric cloud management is not adequate. For example, elastic cloud management tools (e.g., provisioning, allocation) assume resources to be clustered, running on "demilitarized zones" (DMZ) inside the firewalls and further assume network bandwidth to be high and predictable. On the contrary, the future distributed resources will be highly dynamic in their availability and their location, e.g., within a connected community. Network reachability to these resources will thus be varying and security will be a challenge due to their operation inside and outside of various security boundaries.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a universal programming module on a first device collects context and state information from a local application executing on the first device, and provides the context and state information to a context mobility agent on the first device. The context mobility agent establishes a peer-to-peer connection between the first device and a second device, and transfers the context and state information from the first device to the second device over the connection, such that a remote application is configured to execute according to the transferred context and state information from the first device.

According to one or more additional embodiments of the disclosure, a context mobility agent on a first device receives remote context and remote state information from a second device, wherein the remote application had been executing according to the remote context and remote state information, and provides the remote context and remote state information to a universal programming module on the first device. The universal programming module may then configure a local application executing on the first device to execute according to the remote context and remote state information.

According to one or more additional embodiments of the disclosure, an intermediate device provides network access for a first device and a second device, wherein a first application is configured to execute on the first device and a second application is configured to execute on the second device. The intermediate device receives, from the first device, context and state information of the first application executing on the first device, and transfers the context and state information from the first device to the second device (e.g., in response to a trigger), where the second application is configured to execute according to the transferred context and state information from the first device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions.

In addition, "cloud computing" can be defined as Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, virtual machines, edge computing devices, etc. For instance, resources may include service devices (firewalls, deep packet inspectors, traffic monitors, etc.), processing devices (brute force processing capability), storage devices (e.g., servers, network attached storages, storage area network devices), etc.

Figure 1:
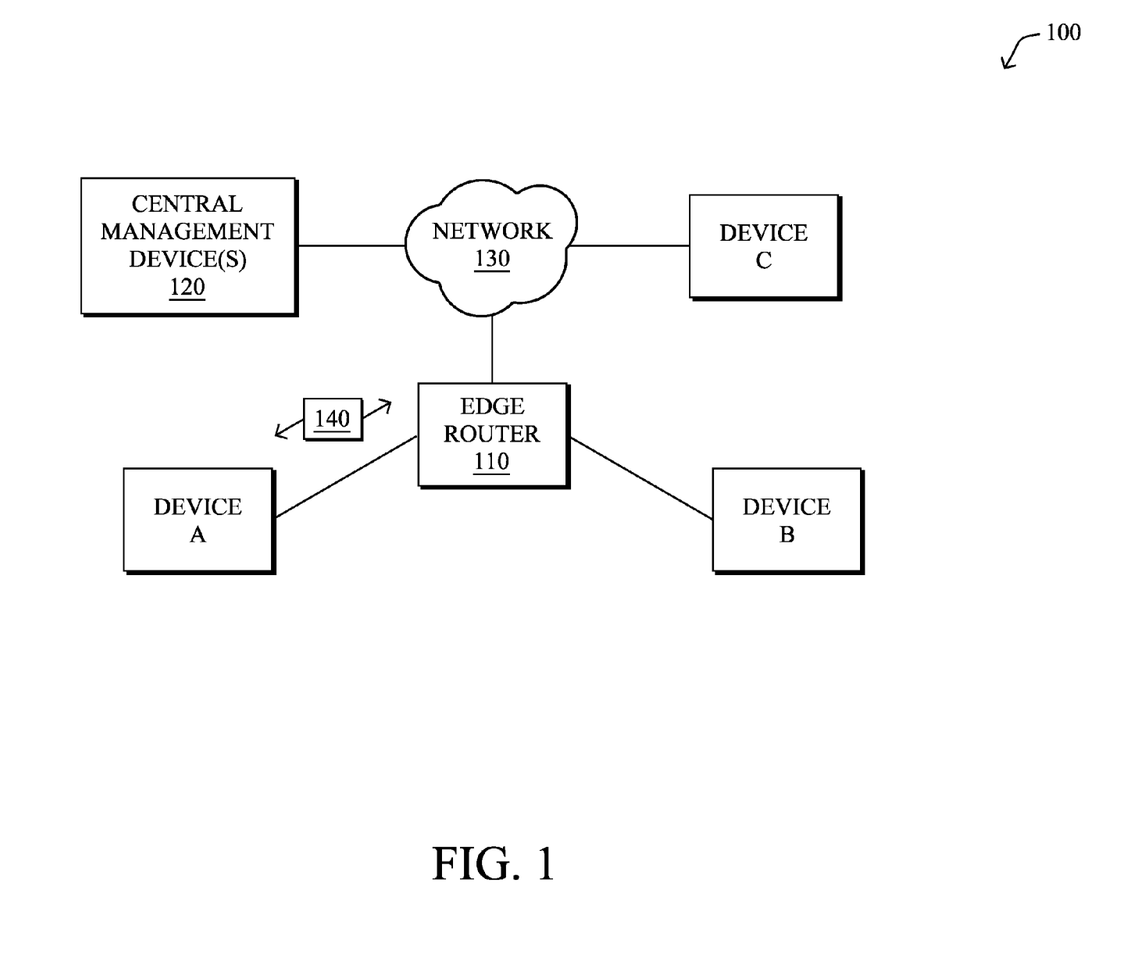
FIG. 1 illustrates an example computer network.

FIG. 1 is a schematic block diagram of an example computer network 100 illustratively comprising nodes/devices interconnected by various methods of communication. For instance, links may be wired links or shared media (e.g., wireless links, PLC links, etc.) where certain nodes may be in communication with other nodes based on physical connection, or else based on distance, signal strength, current operational status, location, etc. Those skilled in the art will understand that any number of nodes, devices, links, etc. may be used in the computer network, and that the view shown herein is for simplicity.

Specifically, devices "A" through "C" may comprise any device with processing and/or storage capability, such as personal computers, mobile phones (e.g., smartphones), gaming systems, portable personal computers (e.g., laptops, tablets, etc.), set-top boxes, televisions, vehicles, etc., and may communicate with the network 130 through one or more edge routers 110 (or other switches, gateways, etc.). In addition, one or more central management devices 120, such as servers, network management servers (NMSs), control centers, etc., may also be interconnected with (or located within) the network 130.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
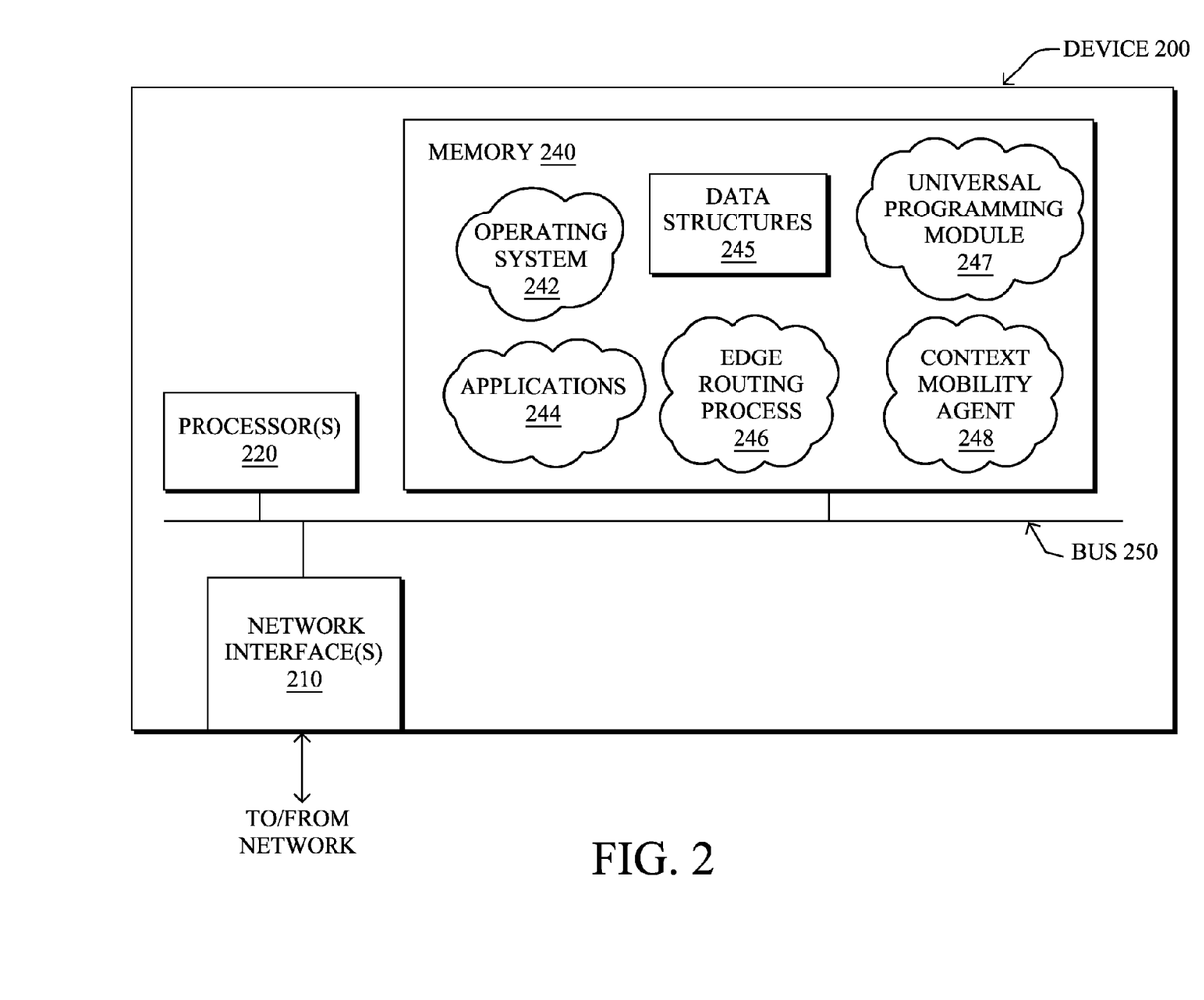
FIG. 2 illustrates an example computing device.

FIG. 2 is a schematic block diagram of an example device 200 that may be used with one or more embodiments described herein, e.g., as any of the devices A through C shown in FIG. 1 above, as well as the edge router 110. The device may comprise one or more network interfaces 210 (e.g., wired, wireless, PLC, etc.), at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system (OS) 242, portions of which are typically resident in memory 240 and executed by the processor, functionally organizes the device by, inter alia, invoking operations in support of software processes and/or services executing on the device. These software processes and/or services may comprise various applications 244, an edge routing process 246 (particularly on the edge router 110), an illustrative universal programming module 247, and an illustrative context mobility agent 248, as described herein. Note that while context mobility agent 248 is shown in centralized memory 240, alternative embodiments provide for the agent/process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes/modules have been shown separately, those skilled in the art will appreciate that they may actually be embodied as routines or modules within other processes/modules.

Generally, edge routing process 246 (on edge routers 110) contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions.

As noted above, the reach of distributed computing and storage resources, such as from both mobile and non-mobile devices, is quite large and continues to grow. These resources can perform a variety of functions related to processing, storing data generated by various sensors and actuator devices as well as interacting and collaborating in a peer-to-peer/peer-to-group manner. For instance, mobile as well as non-mobile applications can generate highly dynamic loads with respect to compute power, geographic location and data volume. Additionally, applications of the future may require mobility of execution state and data context device-to-device irrespective of hardware and operating system platforms.

The techniques herein, therefore, allow application contexts to migrate from device to device, thus providing a smooth context migration without execution interruption. As described herein, the techniques may utilize automatic discovery of edge-router and computing capability, dynamic triggers to activate state migration, context migration using peer-to-peer device communication or the help of a router-edge computing resource. A set of interfaces (e.g., the universal programming module) may be used to abstract application-specific context and state information, and move it from device to device in a secure fashion. In particular, the techniques herein utilize a generic container (e.g., any compliant application 244), and the transfer and restoration of context takes place at the execution and data level using peer-to-peer and peer-to-group communication via a router controller in a distributed and hierarchical manner.

Notably, the context migration techniques herein may be used for two general models of operation. In a first model, the applications are user-based applications, such as webpages, graphical user interface (GUI) processes, word processors, company software, specific programming, etc. In this model, the context switching allows a user to transfer operation of his or her current user application from one device (e.g., a tablet PC) to another device (e.g., a desktop PC). In another model, the applications are cloud-based (distributed computing) applications, where resources are dynamically allocated across multiple nodes/devices of the network 100, and as their associated resources changes (e.g., being required locally), the cloud-based application may be smoothly moved, with the current context and state, to another node/device for continued execution.

Illustratively, the techniques described herein may be performed by hardware, software, and/or firmware, such as in accordance with the universal programming module 247, context mobility agent 248, applications 244, and/or edge routing process 246, which may contain computer executable instructions executed by the processor 220 to perform functions relating to the techniques as described herein, e.g., in conjunction with the other processes.

Figure 3:
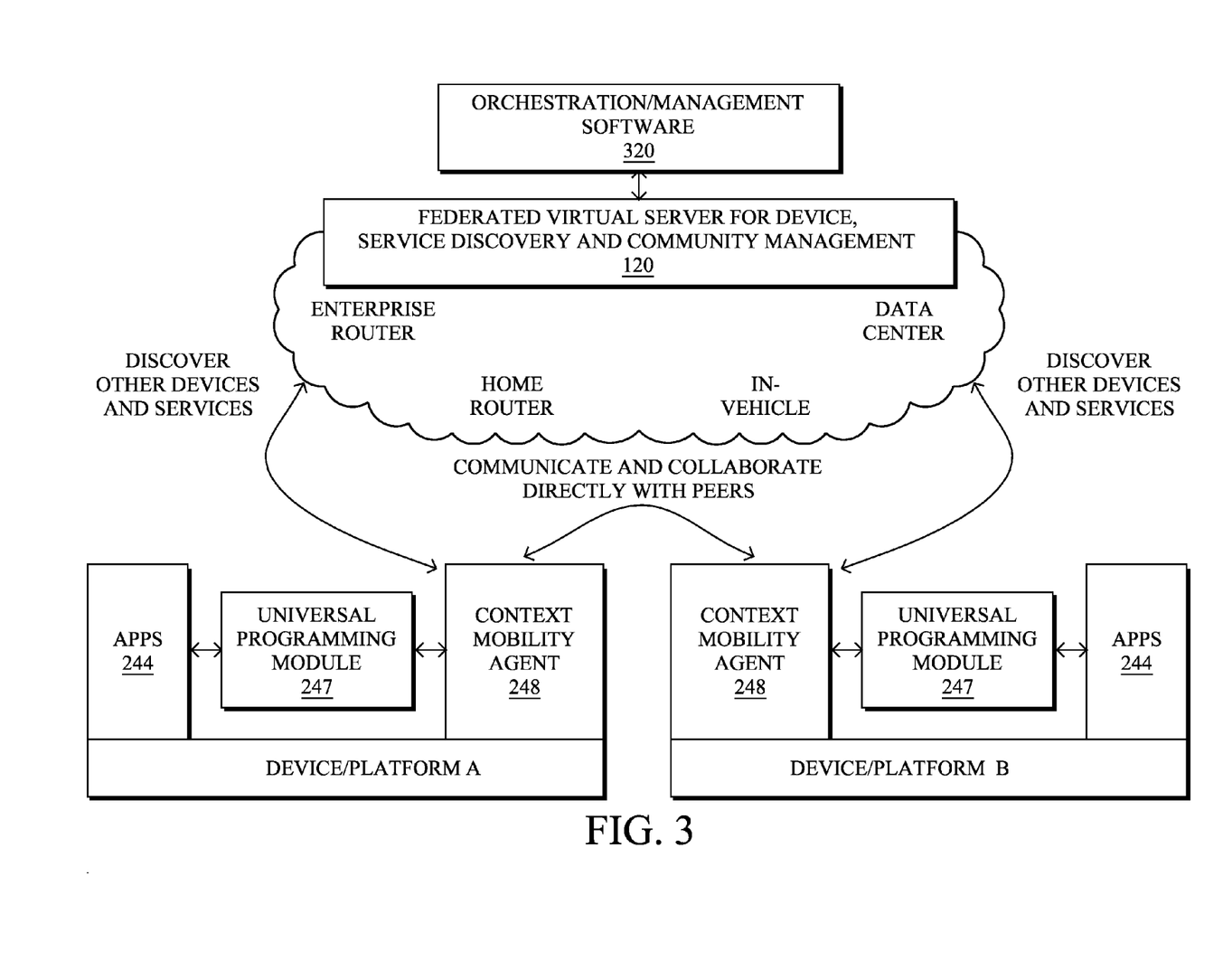
FIG. 3 illustrates another example view of the communication network in FIG. 1.

Operationally, in order to enable such a paradigm of applications and mobility of applications from/to device to/from device/group-of devices at the edges, enabling technology components are described herein that provide the realization of collaboration-in-motion. In particular, the techniques herein are described with general reference to FIG. 3, illustrating a more detailed example view of the network 100 of FIG. 1.

Regarding dynamic discovery and allocation of edge computing resources, in one or more embodiments herein, a discovery service may be hosted on one more Switches/Routers/Gateways located at the edge of the network 130 (e.g., edge router 110), and provides a registry service. In particular, such a registration protocol (e.g., a component of edge routing process 246) may be used to provide a hierarchical, federated system, through which availability of edge compute resources can be discovered by other devices across networks and firewalls, and is one of the components of the distributed intelligence of the network. Each device, such as a smart phone, sensor, etc., may register itself and the amount of resources it can spare with devices that are one level up in the hierarchy (e.g., edge routers). The device's mode of operation (state transition using peer-to-peer, or using edge-router resource, etc.) may also be registered, as well as optionally a list of triggers for state migration as described herein (e.g., presence of a user in a car requiring migration of states related to a particular application).

The devices may also provide access restrictions and security policies that will be used to appropriately direct requests. Generally, the trust between the two devices may be established using well-known security procedures, and is thus not described herein.

Such a hierarchical mechanism may be used to create a detailed picture of the available resources in a distributed manner. It also helps to adapt to the changes in the resources available much faster than a centralized approach. Allocation of the discovered resources, however, is a more challenging problem due to the fact that the quantity of available resources is continuously changing at the edge based on the load on each edge router. Note that in one specific embodiment, the system may use a quality of service (QoS)-based resource allocation scheme in order to provide the optimum performance for each application.

In accordance with another key enabler of the techniques herein, an application 244 that implements the universal programming paradigm (e.g., that utilizes or otherwise cooperates with the module 247) can be dynamically moved from device to device with complete preservation of application context and states. In other words, irrespective of the application, the user will be able to continue working on the transfer-target device at the exact same state where he/she left off on the transfer-originator device.

Figure 4:
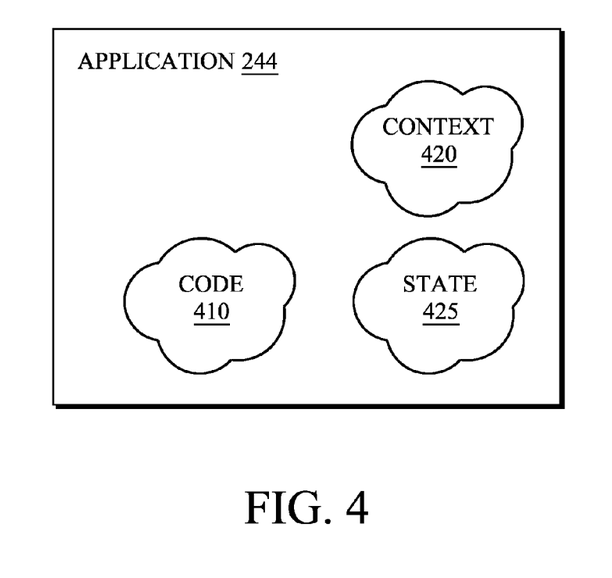
FIG. 4 illustrates an example application.

FIG. 4 illustrates a simplified example of an application 244, which may generally comprise computer executable instructions (code 410) which may be executed by a processor 220 to perform functions specific to the application. In addition, through execution of such code 410, context 420 and state information 425 may be generated, such as, e.g., device location, user credentials, current application execution state, data, cookies, cursor location, visual head-end data, etc.

Figure 5:
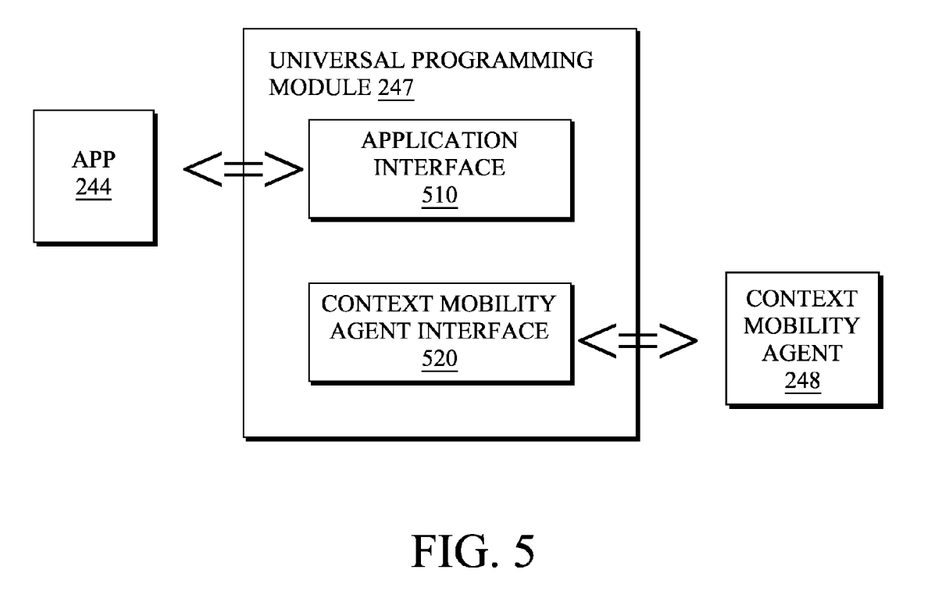
FIG. 5 illustrates an example universal programming module.

In addition, the universal programming paradigm consists of a set of interfaces that each application implements in order to allow for the context transfer functionality described herein. Illustratively, the paradigm may be represented as (or embodied as) A universal programming module 247 as shown in FIG. 5, with an application-facing interface 510, and a context mobility agent-facing interface 520. These interfaces are designed to allow the context mobility agent 248 to obtain the necessary information about the application 244 in order to perform a complete context and state transfer.

The following presents an example of such an interface that would be implemented by a web-browser-based application 244 in order to allow the context mobility agent 248 to collect session information. The session information is conventionally stored as a "cookie" in browser based applications. By using techniques such as, e.g., javascript, the application implements a SessionInfoCollect API. The context mobility agent will thus make a call to this API to obtain the location, name and value of the cookie, and ensure that the same is reproduced on the transfer-target device, as described herein. Said differently, the universal programming paradigm/module allows for the collecting of context and state information from a locally executing application 244, and providing it to the context mobility agent. (In the reverse, described herein, the universal programming paradigm/module also allows for the configuring of a local application to execute according to remote context and remote state information provided from the context mobility agent.) Note that it is inferred that in one embodiment, the context mobility agent may actively obtain the context and state information from the application through the universal programming paradigm, as opposed a universal programming module having an active role in collecting the information.

For mobility of application context, data, and state, the context mobility agent 248 may be used to generally establish a peer-to-peer connection between its device and another device to allow for the transfer of context and state information between the devices over the connection. In this manner, a remote application may be configured to execute according to the transferred context and state information from a local device, and a local application may be configured to execute according to remote context and remote state information from a remote device (where a remote application had been executing according to the remote context and remote state information).

Figure 6:
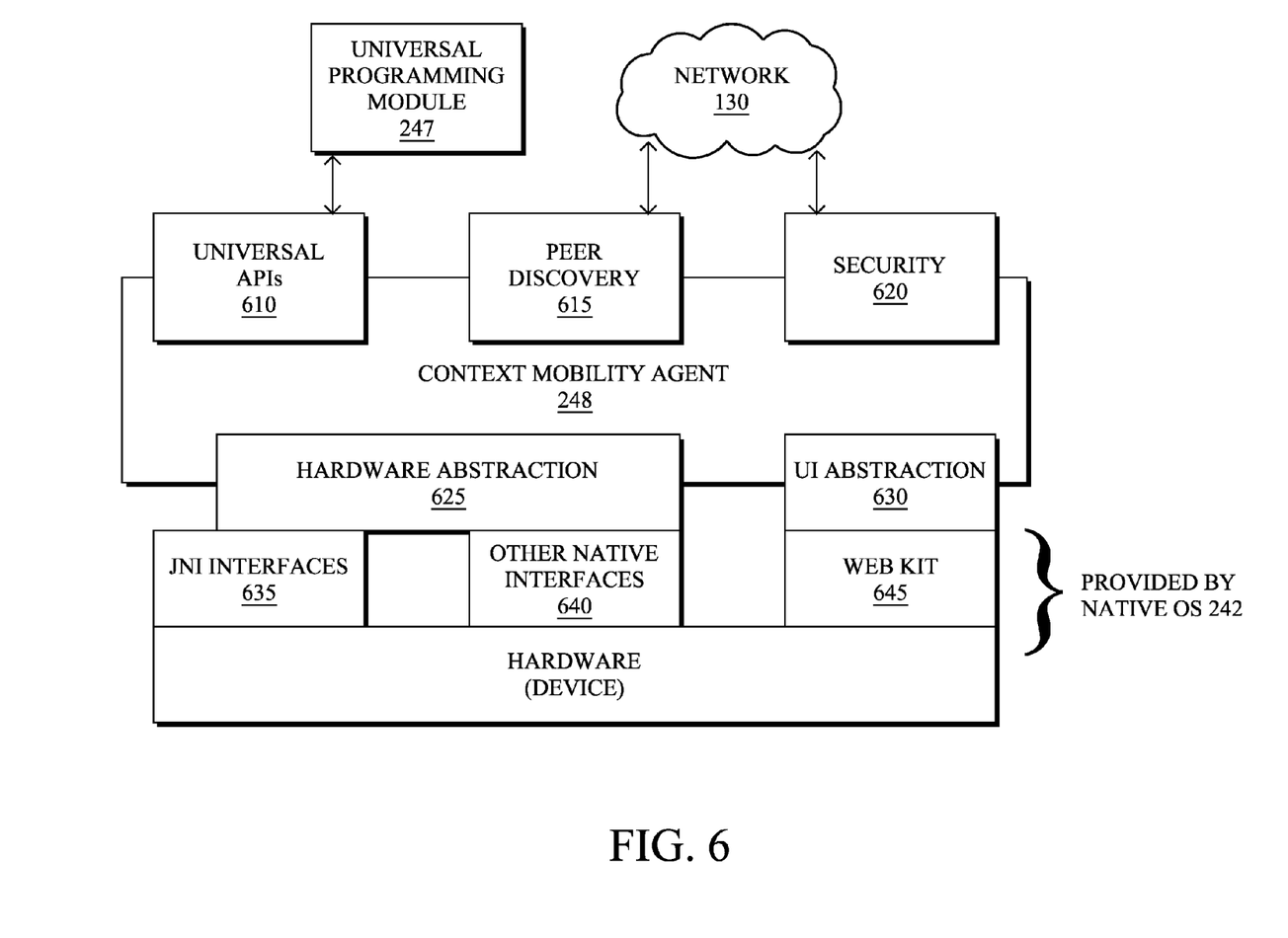
FIG. 6 illustrates an example context mobility agent.

The context mobility agent 248, as illustratively detailed in FIG. 6, is a versatile, platform agnostic, headless module residing on every device that supports the techniques herein, and generally comprises the following functionality:

a. Peer-to-Peer communication between any two devices using generic name-based addressing. In certain scenarios, the applications need to be transferred from an edge device to another, which may use a different operating system 242. In addition, the devices may not be part of the same network and owned by different entities. In order to enable peer-to-peer communication between the devices, peer discovery 615 utilizes an addressing scheme herein that allows devices to discover each other in a generic fashion, which can scale seamlessly. One particular scheme consists of using IP addressing, or instead of using legacy IP, an addressing scheme may use device/service names, port number, and globally unique identifiers (GUID) to identify each device. The discovery mechanism 615 provides a lightweight method to resolve the IP address of the device from its name and vice-versa, and that thus allows the applications to use the underlying TCP/IP network stack.

b. Lower edge functions to access, control, and manage device communications, computing, storage, and application logic. The context mobility agent 248 may utilize a platform specific component (e.g., hardware abstraction 625) that creates the abstracts/wraps around the native interfaces (e.g., java native interface or "JNI" 635 or other native interfaces 640) and allows the export of the Universal APIs 610. In addition, a user interface (UI) abstraction may provide similar functionality with regard to a "web kit" interface 645, as will be understood by those skilled in the art.

c. Ability to capture, serialize, and transfer application data, state, and context between desired device(s). The context mobility agent 248 is capable of transferring any application context between devices. This requires that all applications use a standard interface/container to expose their execution state, context (e.g., variables), etc.

d. A universal API 610, which abstracts platform specific features and allows device independent application logic. That is, the universal API exposes a unified set of features that are rich in functionality and are capable of handling all application requirements in a generic manner, thus essentially converting context and state information between a platform specific format for the local application and a generic format. The universal API 610 forms a sub-layer of the middleware and will have device specific implementation of all the APIs exposed, which can be loosely described as a Hardware Abstraction component (625), providing the links between the native features of the device and the features exposed by the Universal API.

According to a first mode of operation of the techniques herein, the context mobility agent 248 operates on every device, and when a user wants to move an application from device A to device B, device A's agent sends a request to device B, and ensures that device B can execute the desired application 248. Then device A uses its universal programming module to collect the context (data, variables, etc.) from the local application 244, package this information, and sends it to device B's agent. Device B's agent (again using the universal programming module) instantiates the application and populates the context, data, variables, etc., and brings it to the same state as the application was on device A. According to one specific embodiment, agents 248 residing on different nodes may be discovered with the help of the network (e.g., a registration protocol), yet still operate in a peer-to-peer fashion (as described just above).

In an alternative or additional mode of operation, the techniques herein provide for context/state transition that is performed with the help of (i.e., via) edge-computing processes (edge routing process 246) hosted on an intermediate device, such as routers/switches 110 at the edge of the network that provides network access for the two devices. In this case, the context mobility agent 248 residing within a device A may continuously update the edge-router agent with states, where the edge-router is responsible for state transition to another device (as opposed to relying on a peer-to-peer communication). This allows supporting state migration even when a device A dies, with the help of edge-computing resources. Said differently, the intermediate device may receive context and state information, and may simply transfer that to the other device, or else may continually store updated received context and state information, then transferring the context and state information to the other device in response to some trigger, such as the first device failing/losing power/etc.

Notably, should the device B (target/remote device) not be aware of the mode of operation (peer-to-peer or using edge-router resources), device B may first send a multicast message to all known devices of interest (try to discover which context mobility agents to retrieve states from), then followed by the edge-router resource as a last resort.

Note further that in both modes of operation (via an intermediate device or peer-to-peer), a state transition trigger may be used to signify timing of the context transfer. Such triggers could be based on motion detection or other triggers (e.g., user starts using device B) so as to quickly restore the state. That is, the context mobility agents may be configured to transfer context and state information between devices in response to a trigger, such as, e.g., a user input on a source device (e.g., device A), a user input on a target device (e.g., device B or the intermediate device/edge router 110), a user input on a remote device on which the remote application is configured to execute (e.g., device B), a user input on a device on which the remote application is not configured to execute (e.g., device C), activation of the remote application, and detection of the target device by the source device (e.g., carrying a user's smartphone into their vehicle).

According to one or more embodiments herein, application object level security may be provided along with federated trust anchors. In particular, existing security models used for clouds are based on protecting pipes, sessions, and gigabytes of virtual machine codes to/from requesting devices from/to computing clusters. Given the dynamic nature of moving data and execution context from a device to/from another device/group of devices at the fringes of the network where security boundaries are fuzzy, the cloud security model can be completely ineffective, inefficient, and impractical.

A framework described herein may thus be utilized (e.g., by security component 620) in concert with the above universal programming paradigm/module and context mobility agent techniques, where execution and data context that are vital are protected as objects while they migrate from one device to another device or group of devices, as opposed to the traditional manner of protecting pipes, sessions, gigabytes of VM snapshots. Trusted federated edge gateway routers 110 may thus be used as anchor points to dynamically create and exchange object keys (peer-to-peer and peer-to-group keys) that will be relevant between devices (e.g., between consumer and producer device(s) at the edge) for a given locality and time.

Returning again to FIG. 3, orchestration/management software 320 (e.g., on central management devices 120 or otherwise located) allows remote management of the devices through the federated virtual server (e.g., another device 120), and also allows for remotely moving applications from one device to another. The software 320 provides a suitable interface in which many devices may be managed and provisioned from a central point, while allowing the automatic command and control of entire networks of service enabled devices.

In particular, an illustrative orchestration scheme for dynamic provisioning, planning, and scheduling of dynamic edge/fog resources, on a larger scale, service providers/enterprises are able to provision the resources using the efficient generic platform framework to move applications processes from one resource to another. This also creates a straightforward technique for managing millions of devices that may be spread over a large geographic area, or may not even be physically accessible. This is a very important requirement for providers/enterprises of such technologies for purposes other than providing service, which include, for example, billing, load balancing, network efficiency, latency reduction, cost savings, meeting local elastic demand using local fog resources, computing offload (to/from) devices to extend battery life, etc. Other considerations for the orchestration layer moving the execution of an application (its context) from one node to another may be based on various policies such as power, energy, performance, latency, cooling, resource cost, needs in terms of day of week or week of month or month of a year, etc.

As an example of a user application 244, assume for example, that a primary doctor, a nurse, and any number of specialists can move their healthcare application and records from device to device (and back again) in a secure manner, without loosing context, and without needing typical cloud computing resource (e.g., shared storage). Note that in this example, additional security may be provided by approving the transfer of the context and other information (e.g., state information, records, etc.) between the devices, such as on the source device prior to the transferring, and/or on the target device prior to configuring the associated application to execute according to the received context and state information. In addition, provisions may be made for ceasing execution of the source application in response to transferring the context and state information, e.g., in specific response to a received confirmation that the remote application on the target device is executing according to the transferred context and state information from the source device.

Figure 7:
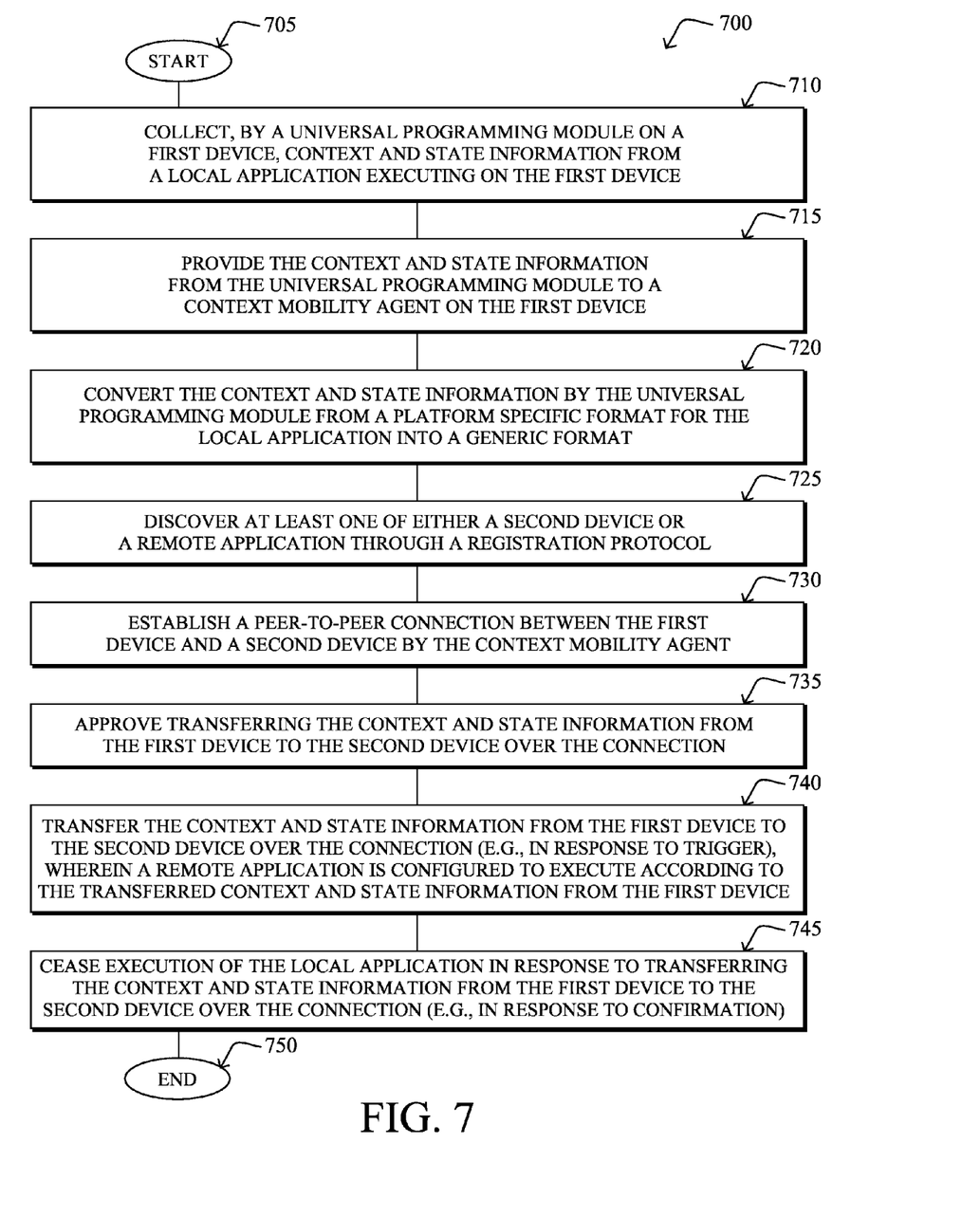
FIG. 7 illustrates an example simplified procedure for context transfer for distributed computing resources, from the perspective of a device first executing an application.

FIG. 7 illustrates an example simplified procedure for context transfer for distributed computing resources in accordance with one or more embodiments described herein, from the perspective of a device first executing an application. The procedure 700 may start at step 705, and continues to step 710, where, as described in greater detail above, a universal programming module 247 on a first device (e.g., device A) collects context and state information (420 and 425) from a local application 244 executing on the first device, and provides the context and state information in step 715 to a context mobility agent 248 on the first device. (Note again that as mentioned above, the context mobility agent may actively obtain the context and state information from the application through the universal programming module, such as where the module is merely a paradigm allowing such retrieval to take place.) The context and state information may be converted in step 720 from a platform specific format for the local application into a generic format, as also mentioned above.

Based on discovery through a registration protocol of at least one of either a second device (e.g., an edge router 110 or a device 115, such as device B) or a remote application 244 specifically in step 725, the context mobility agent may establish a peer-to-peer connection in step 730 between the first device and a second device. Once optionally approving the context and state information transfer from the first device to the second device in step 735 (e.g., user acceptance, security authentication, etc.), the context and state information may be transferred in step 740 from the first device to the second device over the connection (e.g., in response to trigger). Accordingly, as described above, a remote application may then be configured to execute according to the transferred context and state information from the first device. At this time, e.g., in response to a confirmation from the remote application, execution of the local application may cease in step 745, and the procedure 700 may end in step 750.

Figure 8:
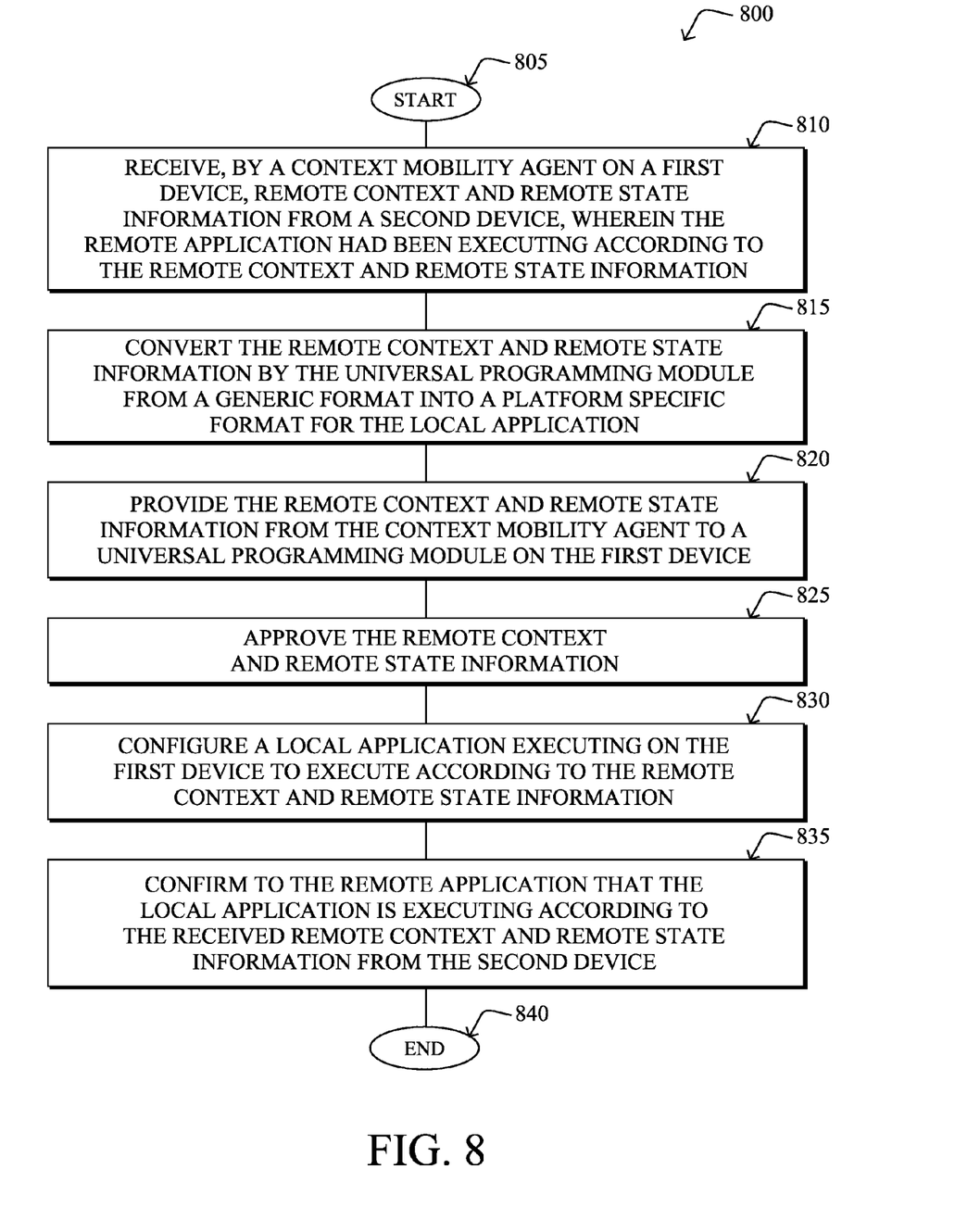
FIG. 8 illustrates another example simplified procedure for context transfer for distributed computing resources, from the perspective of a device receiving context and state information from an already executing application.

Conversely, FIG. 8 illustrates an example simplified procedure for context transfer for distributed computing resources in accordance with one or more embodiments described herein, from the perspective of a device receiving context and state information from an already executing application. The procedure 800 may start at step 805, and continues to step 810, where, as described in greater detail above, a context mobility agent 248 on a first device (e.g., assume the perspective of device B) receives remote context and remote state information from a second device (e.g., device A or the edge router 110), wherein the remote application had been executing according to the remote context and remote state information. In step 815, the remote context and remote state information may be converted (if need be) from a generic format into a platform specific format for the local application 244 on the first device, and the remote context and remote state information may then be provided from the context mobility agent to a universal programming module 247 on the first device in step 820. (Alternatively, again, the module 247 may simply be a paradigm, in which case the context and state information is passed directly to the local application). Optionally in step 825, the use of the remote context and remote state information may be first approved, e.g., securely authenticated or else accepted by a local user of the first device, and then in step 830 the local application may be configured to execute according to the remote context and remote state information. In certain embodiments, in step 835, confirmation may be sent to the remote application that the local application is executing according to the received remote context and remote state information from the second device. The procedure 800 may illustratively end in step 840.

Figure 9:
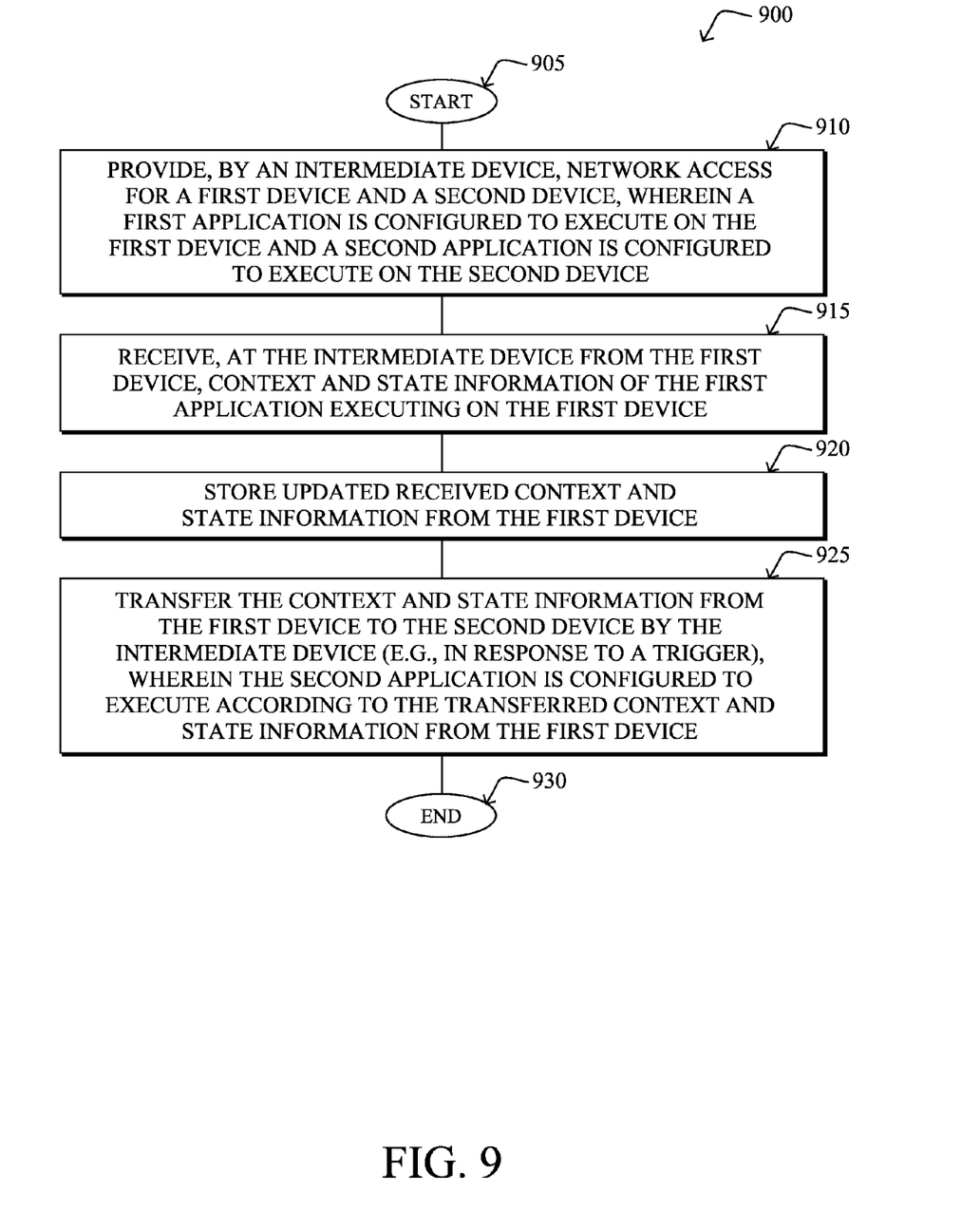
FIG. 9 illustrates another example simplified procedure for context transfer for distributed computing resources, from the perspective of an intermediate device.

In addition, FIG. 9 illustrates an example simplified procedure for context transfer for distributed computing resources in accordance with one or more embodiments described herein, from the perspective of an intermediate device. The procedure 900 may start at step 905, and continues to step 910, where, as described in greater detail above, an intermediate device (e.g., edge router 110) provides network access for a first device and a second device (e.g., device A and device B), wherein a first application is configured to execute on the first device and a second application is configured to execute on the second device. In step 915, the intermediate device may receive, from the first device, context and state information of the first application executing on the first device, such as in response to a trigger, or else continually updated. For instance, where continually updated, in step 920 the intermediate device may store updated received context and state information from the first device, accordingly. In step 925, which may be a passthrough of information or else in response to a particular trigger (where updated context and state information is stored), the intermediate device may transfer the context and state information from the first device to the second device, such that the second application may be configured to execute according to the transferred context and state information from the first device. The procedure 900 illustratively ends in step 930.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The techniques described herein, therefore, provide for context transfer for distributed computing resources. In particular, the techniques herein provide a smooth, secure context migration between devices (e.g., edge devices), thus restoring information to continue application execution when moving to another device. That is, the techniques herein allow a user (or distributed computing process) to move from device to device without losing session continuity.

For example, edge computing (e.g., also called the "fog") may have millions of routers/switches with computing and storage, as well as mobile and non-mobile devices (computing and storage) with heterogeneous characteristics (different OS, different configurations, different processing capability). The techniques herein provide a generic platform framework to take advantage of this explosion where these resources can be virtualized and application processes can be actively moved from one device to another and generally to any available "fog" device. Said differently, the techniques herein provide a generic platform framework (e.g., with an abstraction API) for any application with its execution and data context to be moved and managed, and for efficient resource allocation and utilization across devices.

Existing technologies that allow such application mobility are Remote Display and virtual machine (VM) migration, though these can be considered as opposite ends of the spectrum of technologies that allow users to move between multiple devices. The techniques described herein, however, are positioned in the middle of this spectrum (in terms of capabilities, resources requirements, compatibility, etc.).

For instance, although Remote Display allows users to move from device to device, it involves the significant overhead of each device requiring network connectivity to access the single instance of the application running on a central server/cloud. The approach taken in the current disclosure, however, allows the application to migrate its context from the source device and continue execution on the target device. This allows users and applications more freedom without the constraint of having to be always connected to the network.

At the other end of the spectrum VM migration is an extremely resource intensive procedure that involves moving low-level information such as runtime, process/thread info, stack, etc. This may not feasible for edge devices, as it will take a significant amount of time as well as network bandwidth to move the data from the source to the target. Further, edge devices come with various capabilities and some might not be able to execute a full fledged VM. In contrast, the techniques described herein specify a set of mechanisms to transfer the application context that is often much smaller in size through the use of middleware that is capable of migrating this application context and inflating it on the target device so the application on the target device can quickly resume execution from the context. In this manner the user does not lose session continuity when moving between devices, and the online and real-time approach allows a "hot" transfer as opposed to the cold start mandated while moving VMs.

The techniques herein illustratively make use of a peer-to-peer, edge-router-to-device, and peer-to-group communication, thus mitigating the need for significant infrastructure on the cloud and heavy-duty servers. Transfer and resumption of applications may be performed in a peer-to-peer and edge-router-to-device manner by a Context Mobility Agent resident on the devices, which may be lightly assisted from the registration processes/protocols that can be hosted anywhere on the cloud such as on routers, gateways, and switches.

While there have been shown and described illustrative embodiments that provide for context transfer for distributed computing resources, it is to be understood that various other adaptations and modifications may be made within the spirit and scope of the embodiments herein. For example, the embodiments have been shown and described herein with relation to specific modules, processes, applications, and agents. However, the embodiments in their broader sense are not as limited, and may, in fact, be used with other types of modules, processes, applications, and/or agents, such as combined modules, further separated components, etc. In addition, while certain protocols may have been mentioned, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   automatically discovering, by a context mobility agent executing on a first device, other devices or remote applications utilizing a container, wherein at least a second device and a fog device are discovered, wherein a list of triggers for context and state migration of the first device are registered on the fog device;
   collecting, by a universal programming module on the first device, context and state information from a local application executing on the first device;
   providing the context and state information from the universal programming module to the context mobility agent on the first device;

establishing a peer-to-peer connection between the first device and the second device by the context mobility agent through an edge device operating as the fog device;

converting the context and state information from a platform specific format for the local application into a generic format prior to transferring the context and state information; and in response to at least one of the registered triggers occurring, transferring the converted context and state information from the first device to the second device over the peer-to-peer connection through the fog device, wherein a remote application is configured to execute according to the transferred converted context and state information from the first device so that irrespective of the local application, a user is able to continue working on the second device at a same context and state where the user left off on the first device prior to transferring from the first device.

2. The method as in claim 1, further comprising:

receiving, by the context mobility agent, remote context and remote state information from the second device, wherein the remote application had been executing according to the remote context and remote state information;

providing the remote context and remote state information from the context mobility agent to the universal programming module; and configuring the local application to execute according to the remote context and remote state information.

3. The method as in claim 1, further comprising:

approving transferring the context and state information from the first device to the second device over the connection prior to the transferring.

4. The method as in claim 1, wherein the automatic discovery utilizes a registration protocol.

5. The method as in claim 1, further comprising:

ceasing execution of the local application in response to transferring the context and state information from the first device to the second device over the connection.

6. The method as in claim 1, further comprising:

ceasing execution of the local application in response to confirmation that the remote application is executing according to the transferred context and state information from the first device.

7. The method as in claim 1, wherein the second device is an intermediate device between the first device and a remote device on which the remote application is configured to execute.

8. The method as in claim 7, wherein the second device is configured to transfer the context and state information from the first device to the remote device in response to the at least one of the registered triggers occurring.

9. The method as in claim 1, wherein the context mobility agent is configured to transfer the context and state information to the second device in response to the at least one of the registered triggers occurring.

10. The method as in claim 9, wherein the registered triggers are one or more of a user input on the first device; a user input on the second device; a user input on a remote device on which the remote application is configured to execute; a user input on a third device on which the remote application is not configured to execute; activation of the remote application; or detection of the second device by the first device.

11. The method as in claim 1, wherein context information includes one or more of device location; user credentials; cookies; cursor location; and visual head-end data.

12. The method as in claim 1, wherein the first and second devices are independently a personal computer; a mobile phone; a gaming system; a portable personal computer; a set-top box; a television; and a vehicle.

13. A method, comprising:

receiving, by the context mobility agent on the first device, remote context and remote state information from a second device over a peer-to-peer connection through an edge device operating as a fog device, wherein a remote application had been executing according to the remote context and remote state information and the first device is automatically discovered by the second device utilizing a container, wherein the container exposes at least state and context of the application on the first device;

converting the remote context and remote state information from a generic format into a platform specific format for a local application executing on the first device;

providing the converted remote context and remote state information from the context mobility agent to a universal programming module on the first device in response to a trigger associated with a list of registered triggers identified during automatic discovery; and configuring the local application to execute according to the converted remote context and remote state information so that irrespective of the local application, a distributed computing process is able to continue working on the second device at a same state and context where the distributed computing process left off on the first device prior to transferring from the first device.

14. The method as in claim 13, further comprising:

approving the remote context and remote state information prior to configuring the local application to execute according to the remote context and remote state information.

15. The method as in claim 13, further comprising:

confirming to the remote application that the local application is executing according to the received remote context and remote state information from the second device.

16. An apparatus, comprising:

one or more network interfaces to communicate with a computer network;

a processor coupled to the network interfaces and adapted to execute one or more processes;

a memory configured to store a local application executable by the processor, the application when executed having associated context and state information;

a universal programming module configured to collect the context and state information from the local application and to provide the context and state information; and a context mobility agent configured to automatically discover other devices or remote applications in utilizing a container, wherein at least a second device is discovered, wherein at least a second device and a fog device are discovered and a list of triggers for context and state migration of the first device are registered on the fog device; receive the context and state information from the universal programming module, to establish a peer-to-peer connection with a remote device via an edge device operating as a fog device, to convert the context and state information between a platform specific format for the local application and a generic format, and in response to at least one of the registered triggers occurring, transfer the converted context and state information to the remote device over the peer-to-peer connection through the fog device, wherein a remote application is configured to execute according to the transferred converted context and state information so that irrespective of the local application, a distributed computing process is able to continue working on the second device at a same state and context where the distributed computing process left off on the first device prior to transferring from the first device.

17. The apparatus as in claim 16, wherein the context mobility agent is further configured to receive remote context and remote state information from the remote device, wherein the remote application had been executing according to the remote context and remote state information, and also configured to provide the remote context and remote state information to the universal programming module, and wherein the universal programming module is further configured to configure the local application to execute according to the remote context and remote state information.

* * * * *